(12) United States Patent
Branscomb

(10) Patent No.: US 8,271,363 B2
(45) Date of Patent: Sep. 18, 2012

(54) SYSTEM AND METHOD FOR BANKING DOWNSTREAM RESOURCE COSTS

(76) Inventor: Bennett Hill Branscomb, San Francisco, CA (US)

( * ) Notice: Subject to any disclaimer, the term of this patent is extended or adjusted under 35 U.S.C. 154(b) by 657 days.

(21) Appl. No.: 12/047,204

(22) Filed: Mar. 12, 2008

(65) Prior Publication Data

US 2008/0270272 A1    Oct. 30, 2008

Related U.S. Application Data

(60) Provisional application No. 60/913,990, filed on Apr. 25, 2007, provisional application No. 60/968,343, filed on Aug. 28, 2007.

(51) Int. Cl.
*G07F 19/00* (2006.01)
*G06Q 40/00* (2012.01)

(52) U.S. Cl. ............. 705/34; 705/35; 705/37

(58) Field of Classification Search .................. None
See application file for complete search history.

(56) References Cited

U.S. PATENT DOCUMENTS

| | | | |
|---|---|---|---|
| 7,647,207 B2 | 1/2010 | McConnell et al. | |
| 2002/0143693 A1* | 10/2002 | Soestbergen et al. | ........... 705/37 |
| 2004/0200393 A1 | 10/2004 | Zauderer | |
| 2005/0154669 A1 | 7/2005 | Streetman | |
| 2006/0032788 A1 | 2/2006 | Etter | |
| 2006/0089851 A1 | 4/2006 | Silby et al. | |
| 2006/0106635 A1 | 5/2006 | Ulrich et al. | |
| 2006/0184445 A1 | 8/2006 | Sandor et al. | |
| 2009/0157534 A1 | 6/2009 | Arsiwala | |

OTHER PUBLICATIONS

Sven Wunder, The Efficiency of Payments for Environmental Services in Tropical Conservation, Feb. 2007, Conservation Biology, vol. 21, 1-58.*

Kenneth M. Chomitz, Financing environmental services: the Costa Rican experience and its implications, May 1999, The Science of the Total Environment 240 (1999) 157-169.*

International Search Report and Written Opinion received in corresponding International application No. PCT/US08/59210 dated Aug. 8, 2008.

* cited by examiner

*Primary Examiner* — Ryan Zeender
*Assistant Examiner* — Denisse Ortiz Roman
(74) *Attorney, Agent, or Firm* — Wong, Cabello, Lutsch, Rutherford & Brucculeri, L.L.P.

(57) ABSTRACT

In a system according to the invention, a sum of money related to the current or projected cost of pollution remediation associated with the use of a particular mineral resource is banked at the time of the mineral's extraction, first sale or entry into the stream of commerce. Disbursement of the banked monies may be made to downstream processors, end users, effected entities or third parties for remediation, sequestration or conservation activities or simply for recompense. In one embodiment of the invention, dynamic tracking systems may apportion the payout as a function of measured observed winds and precipitation patterns. In this way, the true economic cost of a particular mineral resource may be more accurately reflected in its selling price.

31 Claims, 3 Drawing Sheets

SYSTEM AND METHOD FOR BANKING DOWNSTREAM RESOURCE COSTS

CROSS-REFERENCE TO RELATED APPLICATIONS

This application claims the benefit of U.S. Provisional Application Ser. No. 60/913,990 filed Apr. 25, 2007, and entitled "Dynamic Metering, Measuring and Valuation System for Oil, Gas, and Mineral Feedstock Pollution Netback Banking System," and U.S. Provisional Application Ser. No. 60/968,343 filed Aug. 28, 2007, the disclosures of which are hereby incorporated by reference in their entireties.

STATEMENT REGARDING FEDERALLY SPONSORED RESEARCH OR DEVELOPMENT

Not Applicable

BACKGROUND OF THE INVENTION

1. Field of the Invention

This invention relates to the allocation and management of pollution costs and credits. More particularly, it relates to a method for banking a portion of the cost of a resource and rebating portions of the banked fund on the basis of activities relating to the use of the resource.

2. Description of the Related Art Including Information Disclosed Under 37 CFR 1.97 and 1.98

Many natural resources, especially fossil fuels, comprise pollutants which have a negative impact when released into the environment. Some pollutants are impurities in the resource material—e.g., sulfur and mercury in coal—whose level may vary depending on the source and/or processing steps taken during recovery of the resource. Other pollutants result from the use of a resource—e.g., oxides of nitrogen ($NO_x$) and the greenhouse gas carbon dioxide ($CO_2$) created during the combustion of hydrocarbon fuels. When $NO_x$ and volatile organic compounds (VOCs) react in the presence of sunlight, they form photochemical smog, a significant form of air pollution, especially in the summer. Children, people with lung diseases such as asthma, and people who work or exercise outside are particularly susceptible to the adverse effects of smog such as damage to lung tissue and reduction in lung function. Mono-nitrogen oxides eventually form nitric acid when dissolved in atmospheric moisture, forming a component of acid rain.

The pollution potential of some natural resources depends on the particular use that is made of the resource. For example, wood used as lumber may sequester the carbon comprising that wood for decades whereas the same wood used as firewood releases the carbon as carbon dioxide and VOCs into the atmosphere. As a further complication, different portions of a natural resource may be put to different uses. When harvesting a tree (a natural resource), the stump, roots and foliage may be composted; the straighter portions of the trunk sawn into lumber; the branches chipped for use in oriented strand board (OSB) or ground for medium density fiberboard (MDF); and, the bark burned in a furnace. Likewise, a barrel of crude oil may be partially fractionated into various fuels (bunker fuel, diesel, gasoline, kerosene and jet fuel), partly used as lubricating oil and partially used for the production of petrochemicals. Absent a recovery mechanism, the carbon in that crude oil will enter the atmosphere (predominately) as $CO_2$ for that portion of the oil used as fuel but the carbon in the lubricating oil fraction and petrochemical products may not (depending on the form of their ultimate disposal).

Greenhouse gases are components of the atmosphere that contribute to the greenhouse effect. Greenhouse gases include (in the order of relative abundance): water vapor, carbon dioxide, methane, nitrous oxide, and ozone. Greenhouse gases are known to emanate from both natural sources and human activity.

With the increase in concern over global climate change, a great deal of interest has been directed to the emission of greenhouse gases, carbon dioxide in particular. When a hydrocarbon is burned—i.e., oxidized—carbon dioxide and water (both greenhouse gases) are produced. By way of example, consider the combustion (in air) of natural gas (consisting essentially of methane):

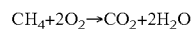

$$CH_4 + 2O_2 \rightarrow CO_2 + 2H_2O$$

The combustion of each molecule of methane produces one molecule of carbon dioxide.

Likewise, consider the combustion (in air) of gasoline (a mixture of hydrocarbons which can be represented by octane, $C_8H_{18}$):

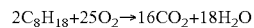

$$2C_8H_{18} + 25O_2 \rightarrow 16CO_2 + 18H_2O$$

The combustion of each molecule of octane produces eight molecules of carbon dioxide.

"Operating netback" is a financial metric used specifically in the oil and gas industry as a benchmark to compare performance between time periods, operations and competitors. It is a measure of oil and gas sales net of royalties, production and transportation expenses. The measure is generally calculated based on the oil or gas selling unit—e.g., per barrel in the case of oil. For example, suppose an oil company's Canadian operation sells oil at an average of $80 per barrel if royalties, production and transportation costs equal $25, $15 and $18, respectively. In this case, the operating netback for the Canadian operation equals $22 a barrel. The calculated operating netback can be compared to the specific operations' past performance or a competitor's performance in the same region.

Various schemes have been proposed for reallocating the pollution costs associated with using certain resources. For example, "personal carbon trading" is designed to be a mandatory program wherein emissions credits are equally allocated to individuals on a per capita basis, within national carbon budgets. Individuals would then have to surrender these credits when buying fuel or electricity. Individuals wanting or needing more energy would be able to partake in emissions trading to secure more credits, similar to what companies do now within the European Union Emission Trading Scheme.

The European Union Emission Trading Scheme (EU ETS) is the largest multi-national, greenhouse gas emissions trading scheme. Under the EU ETS, large emitters of carbon dioxide within the EU must monitor and annually report their $CO_2$ emissions, and are obliged to surrender (give back) every year a number of emission allowances to the government that is equivalent to their $CO_2$ emissions in that year. The installations may get the allowances without cost from the government, or may purchase them from others (installations, traders, the government.) If an installation has received more free allowances than it needs, it may sell them to anybody.

Emissions trading (sometimes called "cap and trade") is an administrative approach intended to control pollution by providing economic incentives for achieving reductions in the emissions of pollutants. A central authority (usually a government or international body) sets a limit or cap on the quantity of a particular pollutant that can be emitted. Companies or other groups are issued emission permits and are required to hold an equivalent number of allowances (or credits) which represent the right to emit a specific amount. The total amount of allowances and credits cannot exceed the cap, thereby limiting total emissions to that level. Companies that need to increase their emissions must buy credits from those who pollute less. The transfer of allowances is referred to as a trade. In effect, the buyer is paying a charge for polluting, while the seller is being rewarded for having reduced emissions by more than was required. Thus, in theory, those who can most easily reduce emissions will do so, achieving the pollution reduction at the lowest possible cost to society. There are currently active trading programs in several pollutants. For greenhouse gases, the largest is the European Union Emission Trading Scheme. In the United States there is a national market designed to reduce acid rain and several regional markets in oxides of nitrogen.

A carbon tax is a government-imposed tax on energy sources which produce carbon dioxide. Typically, the price per unit of emissions is fixed—i.e., there is not a fluctuating market price. The European Union has discussed a carbon tax covering its member states to supplement the carbon emissions trading scheme begun in January 2005—the EU ETS trading scheme discussed above.

The purpose of a carbon tax is environmental—to encourage users to reduce their emissions of carbon dioxide and thereby slow global warming. It can be implemented by taxing the burning of fossil fuels—coal, petroleum products such as gasoline and aviation fuel, and natural gas—in proportion to their carbon content. Unlike market-based approaches such as carbon cap-and-trade systems, it has the advantage of being easily understood and the tax revenues generated can be used to fund environmental projects.

On Jan. 1, 1991, Sweden imposed a carbon tax on the use of oil, coal, natural gas, liquefied petroleum gas, petrol, and aviation fuel used in domestic travel. Industrial users paid half the rate and certain high-energy industries such as commercial horticulture, mining, manufacturing and the pulp and paper industry were exempted from the tax. Finland, the Netherlands, and Norway also introduced carbon taxes in the 1990s.

A carbon dioxide ($CO_2$) sink is a carbon dioxide reservoir that is increasing in size, and is the opposite of a carbon dioxide "source." The main natural sinks are (1) the oceans and (2) plants and other organisms that use photosynthesis to remove carbon from the atmosphere by incorporating it into biomass and release oxygen into the atmosphere. This concept of $CO_2$ sinks has become more widely known because the Kyoto Protocol allows the use of carbon dioxide sinks as a form of carbon offset.

Carbon capture and storage is a scheme to mitigate global warming by capturing carbon dioxide ($CO_2$) from large point sources such as fossil fuel power plants and storing it rather than releasing it into the atmosphere. Technology for large scale capture of $CO_2$ is commercially available and fairly well developed. Although $CO_2$ has been injected into geological formations for various purposes, the long term storage of $CO_2$ is a relatively untried concept and as of the date hereof no large scale power plant is known to operate with a full carbon capture and storage system.

Currently, capture of carbon dioxide is performed on a large scale by absorption of carbon dioxide onto various amine-based solvents. Other techniques have been proposed including pressure swing adsorption, temperature swing adsorption, gas separation membranes, and cryogenics. Pilot studies have included flue capture and conversion to baking soda and the use of algae for conversion to fuel or feed.

In coal-fired power stations, the main alternatives to retrofitting amine-based absorbers to existing power stations are two new technologies: coal gasification combined-cycle and Oxy-fuel combustion. Gasification first produces a "syngas" primarily of hydrogen and carbon monoxide, which is burned, with carbon dioxide filtered from the flue gas. Oxy-fuel combustion burns the coal in oxygen instead of air, producing only carbon dioxide and water vapor, which are relatively easily separated. Oxy-fuel combustion, however, produces very high temperatures, and the materials to withstand its temperatures are still under development.

Another long-term option may be carbon capture directly from the atmosphere using hydroxides. In this scheme, the air would be chemically scrubbed of its $CO_2$ content. This carbon capture mechanism offers an alternative to the use of non-carbon-based fuels in the transportation sector (for which there are fewer current options).

U.S. Patent Application Publication No. 2005/0154669 describes a carbon credit system wherein a carbon credit product or carbon credit service can be purchased through carbon credit software and which carries a predetermined number of carbon credits. The purchase causes a certificate bearing a carbon credit consumer symbol to be sent to the purchaser. This carbon credit marketing system is designed to enable a consumer to pay for the amount of greenhouse gases he or she produces as a result of his or her consumption of goods and services which effect emission of such gases. This is accomplished though the purchase and sale of carbon credits which in turn correlate to a carbon credit value assigned to a producer or user. The carbon credit software allows the creation of a client account and maintains a carbon credit balance in the account.

Emissions trading (or "cap and trade") is an administrative approach designed to control pollution by providing economic incentives for achieving reductions in the emissions of pollutants.

A central authority (usually a government) sets a limit or cap on the amount of a certain pollutant that can be emitted. Companies or other entities are issued emission permits and are required to hold an equivalent number of allowances (or credits) which represent the right to emit a specific amount of that pollutant. The total amount of allowances and credits cannot exceed the cap, thereby limiting total emissions to a certain level. Companies that need to increase their emissions must buy credits from those who pollute less. The transfer of allowances is referred to as a trade. In effect, the buyer is paying a premium for polluting, while the seller is being rewarded for having reduced emissions by more than was required. Thus, in theory, those that can reduce emissions most cheaply will do so, thereby achieving pollution reduction at the lowest possible cost to society. Carbon emissions trading is emissions trading specifically for carbon dioxide (calculated in tons of carbon dioxide equivalent or t$CO_2$e) and currently makes up the bulk of emissions trading.

The overall goal of an emissions trading plan is to reduce emissions. The cap is usually lowered over time towards a national emissions reduction target. In other systems a portion of all traded credits must be retired, causing a net reduction in emissions each time a trade occurs. In many cap-and-trade systems, organizations which do not pollute may also participate, thus environmental groups can purchase and retire allowances or credits and hence drive up the price of the remainder per the law of supply and demand. Corporations can also prematurely retire allowances by donating them to a nonprofit or charitable entity and then be eligible for a tax deduction. Allowances may be accounted for on the balance sheet of a company as intangible assets Because emissions trading uses markets to determine how to deal with the problem of pollution, it is often touted as an example of effective free market environmentalism. While the cap is usually set by a political process, individual companies are free to choose how or if they will reduce their emissions. In theory, firms will choose the lowest cost way to comply with the pollution regulation, creating incentives that reduce the cost of achieving a pollution reduction goal.

The textbook emissions trading program can be called a "cap-and-trade" approach in which an aggregate cap on all sources is established and these sources are then allowed to trade among themselves to determine which sources actually emit the total pollution load. An alternative approach is a "baseline and credit program" wherein a group of polluters that are not under an aggregate cap can create credits by reducing their emissions below a baseline level of emissions. These credits can be purchased by polluters that are under a regulatory limit.

There are active trading programs in several pollutants. For greenhouse gases, the largest is currently the European Union Emission Trading Scheme (EU ETS). In the United States the most prominent example of an emission trading system is the $SO_2$ trading system under the framework of the Acid Rain Program of the 1990 Clean Air Act. Under this program, which is essentially a cap-and-trade emissions trading system, $SO_2$ emissions are expected to be reduced by 50% between 1980 and 2010. Several regional markets in nitrous oxide also exist in the United States. Markets for other pollutants tend to be smaller and more localized. In 2003, some corporations began voluntarily trading greenhouse gas emission allowances on the Chicago Climate Exchange.

An emission cap and permit trading system is a quantity instrument because it fixes the overall emission level (quantity) and allows the price to vary. One problem with the cap-and-trade system is the uncertainty of the cost of compliance inasmuch as the price of a permit is not known in advance and will vary according to market conditions. In contrast, an emission tax is a price instrument because it fixes the price while the emission level is allowed to vary according to economic activity. A major drawback of emission taxes is that the environmental outcome (i.e., the quantity of emissions) is not guaranteed.

Some scientists, however, have warned of a threshold in atmospheric concentration of carbon dioxide beyond which a run-away warming effect could take place. If this is a real risk, a quantity instrument could be a better choice because the quantity of emissions may be capped with a higher degree of certainty. However, this may not be true if this risk exists but cannot be attached to a known level of GHG concentration or a known emission pathway.

A third option of the prior art, known as a "safety valve", is a hybrid of the price and quantity instruments. The system is essentially an emission cap and tradable permit system but the maximum (or minimum) permit price is capped. Emitters have the choice of either obtaining permits in the marketplace or purchasing them from the government at a specified trigger price (which could be adjusted over time). The system is sometimes recommended as a way of overcoming the fundamental disadvantages of both systems by giving governments the flexibility to adjust the system as new information becomes available. By setting the trigger price high enough, or the number of permits low enough, the safety valve can be used to mimic either a pure quantity or pure price mechanism.

The European Union Emission Trading Scheme (or EU ETS) is the largest multi-national, greenhouse gas emissions trading scheme in the world and was created in conjunction with the Kyoto Protocol. It is currently the world's only mandatory carbon trading program.

After voluntary trials in the UK and Denmark, Phase I commenced operation in January 2005 with all 15 (now 25 of the 27) member states of the European Union participating. The program caps the amount of carbon dioxide that can be emitted from large installations such as power plants and carbon-intensive factories and covers almost half of the EU's carbon dioxide emissions. Phase I permits participants to trade among themselves and in validated credits from the developing world through the Kyoto Protocol's Clean Development Mechanism. Phase II links the EU ETS to other countries participating in the Kyoto Protocol's trading system.

Over a decade ago, many countries joined an international treaty—the United Nations Framework Convention on Climate Change (UNFCCC)—to begin to consider what might be done to reduce global warming and to cope with any inevitable temperature increases. A number of nations have approved an addition to the treaty, the so-called Kyoto Protocol, which binds most developed nations to a cap-and-trade system for major greenhouse gasses. Emission quotas were agreed upon by each participating country, with the intention of reducing their overall emissions to 1990 levels by the end of 2012. Under the terms of the treaty, nations that emit less than their quota will be able to sell emissions credits to nations that exceed their quota.

It is also possible for developed countries within the trading scheme to sponsor carbon projects that provide a reduction in greenhouse gas emissions in other countries, as a way of generating tradable carbon credits. The Protocol allows this through Clean Development Mechanism (CDM) and Joint Implementation (JI) projects, in order to provide flexible mechanisms to aid regulated entities in meeting their compliance with their caps. CDM is a mechanism under the Kyoto Protocol through which developed countries may finance greenhouse-gas emission reduction or removal projects in developing countries, and receive credits for doing so which they may apply towards meeting mandatory limits on their own emissions. Certified emission reductions (CER)—a Kyoto Protocol unit equal to 1 metric ton of $CO_2$ equivalent—are issued for emission reductions from CDM project activities. Two special types of CERs called temporary certified emission reduction (tCERs) and long-term certified emission reductions (lCERs) are issued for emission removals from afforestation and reforestation CDM projects. The UNFCCC validates all CDM projects to ensure they create genuine additional savings and that there is no "leakage"—an increase in carbon dioxide emissions by some countries as a reaction to an emission reduction by countries with a strict climate policy.

An enforcement mechanism is a critical part of any emissions trading scheme. Without effective enforcement, the allowances have no value. Two basic schemes have been proposed. In one, regulators measure facilities and fine or sanction those that lack the necessary allowances for their emissions. This scheme is quite expensive to enforce and the burden falls on the agency which may need to collect special taxes to finance the program. The net effect of a poorly financed or corrupt regulatory agency is a discount on emission licenses, and greater pollution.

In another scheme, a third party agency, certified or licensed by the government, verifies that polluting facilities have allowances equal or greater than their emissions. Inspection of the certificates may be performed in some automated fashion by the regulators or as part of tax collection. The regulators then audit licensed facilities chosen at random to verify that the certifying agencies are acting correctly. This scheme places the cost of most regulation on the private sector.

A "carbon offset" is an act by an individual or organization that mitigates (i.e., offsets) greenhouse gas emissions. Thus, one may pay for emission reductions elsewhere rather than reducing one's own emissions. For a given entity, offsets may be a cheaper or more convenient alternative to reducing fossil fuel consumption. In contrast to emissions trading, which is regulated within a legal framework, carbon offsets generally refer to acts by individuals or companies that are arranged by commercial or not-for-profit carbon-offset providers.

Currently used carbon offsets fall into four categories: tree planting, energy conservation, renewable energy and methane capture. Tree planting acts to offset carbon emissions because trees sequester carbon through photosynthesis, converting carbon dioxide and water into molecular oxygen ($O_2$) and plant organic matter, such as carbohydrates (e.g., cellulose). Tree planting includes not only reforestation but also the avoidance of deforestation and afforestation, the establishment of forests on land not previously forested. This can produce higher carbon sequestration rates because the level of carbon in such land is comparatively low. Trees provide other benefits in addition to capturing carbon dioxide, such as providing habitats for animals and renewable resources, such as lumber and other wood-based building materials, and preventing soil erosion.

Energy conservation can constitute a carbon offset by reducing the overall demand for energy. Examples include cogeneration plants that generate both electricity and process heat from the same power source, thus improving the overall energy efficiency of the plant, fuel efficiency projects that replace a device with one which uses less fuel per unit of energy provided such as the substitution of fluorescent lights for incandescent lights. Assuming energy demand does not change, this reduces the total carbon dioxide emitted by the burning of fossil fuels. Another example of energy conservation which may constitute a carbon offset is improved energy efficiency of buildings such as additional (or more effective) insulation, the installation of double-glazed windows and more efficient heating, cooling or lighting systems. New buildings can also be constructed using less carbon-intensive materials.

The development and/or utilization of renewable energy can also be a carbon offset. Currently, wind farms, solar energy installations, hydroelectric facilities and biofuel production are the most common forms of renewable energy. A connection is sometimes made between carbon offsets and renewable energy certificates (RECs), also known as Green Tags. An REC represents a certain quantity of electricity which was generated from renewable sources. By purchasing an REC, the customer pays money to a renewable energy project owner. Typically, the windmill or solar panels have already been installed which leads to lower carbon emissions.

Methane gas has global warming potential 23 times that of carbon dioxide. However, when combusted, each molecule of methane produces one molecule of carbon dioxide. Thus, the collection and combustion of methane may be preferable to merely releasing it into the atmosphere. Some offset projects consist of combusting or containing methane generated by farm animals, landfills or other industrial waste. Methane can also be processed using an anaerobic digester which generates electricity or heat.

Once it has been accredited by the UNFCCC, a carbon offset project can be used as carbon credit and linked with official emission trading schemes, such as the European Union Emission Trading Scheme or Kyoto Protocol, as Certified Emission Reductions.

BRIEF SUMMARY OF THE INVENTION

In contrast to many of the described prior art systems, the present invention focuses on apportioning the environmental costs of the pollutants in a resource to the original owner of the resource. A sum of money related to the current or projected cost of pollution remediation associated with the use of a particular mineral resource is banked at the time of the mineral's extraction, first sale or entry into the stream of commerce. Downstream processors, end users, effected entities or third parties may recover money from the banked fund for remediation, sequestration or conservation activities or simply for recompense. For example, an oil company may pay a royalty to a landowner for the oil and/or gas which it extracts from wells located on the land and simultaneously pay a "carbon netback" on behalf of the mineral owner or itself, into a system according to the present invention which is banked. A system and method according to the invention may subsequently dispense a portion of the banked funds to a refinery that diverts a portion of the produced oil to petrochemicals (thereby sequestering some fraction of the carbon contained in the oil). In another example, a coal mining operation may pay into the system a certain amount per part-per-thousand (ppt) sulfur per ton of coal produced. A portion of the accumulated fund may be dispensed as compensation to a state or other political subdivision that is downwind of a power plant that burns the coal as fuel and in so doing produces sulfur dioxide that results in acid rain falling on that state. In one embodiment of the invention, dynamic tracking systems may apportion the payout as a function of measured observed winds and precipitation patterns. The power plant may become eligible for a portion of the banked fund by installing flue gas desulfurization scrubbing systems to remove sulfur dioxide from its flue gases. In this way, the true economic cost of a particular mineral resource may be more accurately reflected in its selling price, and borne by the original owner that causes the resource to be introduced into the stream of commerce.

BRIEF DESCRIPTION OF THE SEVERAL
VIEWS OF THE DRAWING(S)

DETAILED DESCRIPTION OF THE INVENTION

Minerals generally, and hydrocarbons in particular, are subjected to a number of processing steps from their extraction to their final use form as delivered to end users. A generic process is shown as a block diagram in FIG. 1. At block 10, the mineral is extracted from the mine or well. As discussed below in the context of specific examples, the mineral is typically processed to some extent at (or near) the extraction point. This is shown at block 20 in FIG. 1. The mineral is then typically transported to one or more remote facilities for "mid-stream processing" (block 30) for treatment to put the mineral in one or more forms that can be utilized by end users.

Figure 1:
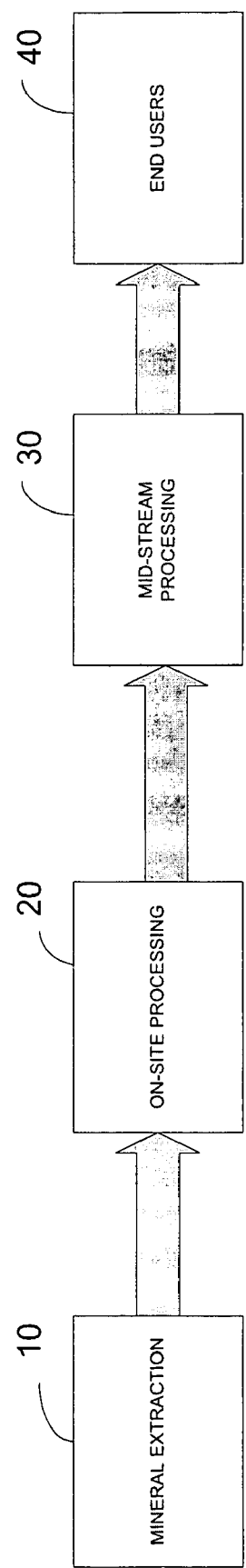
FIG. 1 is a block diagram showing the basic steps involved in the production and use of a generic mineral.

As shown at block 40 in FIG. 1, the mineral may then be transported to end users or to retail establishments for sale to end users.

By way of example, the general process illustrated in FIG. 1 may be applied to the production of coal. At block 10, coal is extracted from the earth at a mine. This may be a surface mine ("strip mine") or an underground mine ("deep mine"). The coal so obtained is then usually transported by truck or conveyer to an on-site Coal Preparation Plant (CPP)—a facility that washes coal of soil and rock, preparing it for transport to market. A CPP may also be called a Coal Handling and Preparation Plant (CHPP), "prep plant," "tipple," or "wash plant". The more of this waste material that can be removed from coal, the greater its market value and the lower its transportation costs. If the end user is a power plant, this may be the only processing required and the coal may be transported directly to the power plant from the mine by rail, truck or barge—i.e., no mid-stream processing may be required and block 30 of FIG. 1 is omitted. Alternatively, various mid-stream processing steps may be applied. For example, the coal may be crushed and mixed with water to form a slurry for transport by pipeline. In another example the coal may be gasified. Coal gasification breaks down the coal into its components, usually by subjecting it to high temperature and pressure, using steam and measured amounts of oxygen. This leads to the production of syngas, a mixture mainly consisting of carbon monoxide (CO) and hydrogen ($H_2$). In the past, coal was converted to make coal gas, which was piped to customers to burn for illumination, heating, and cooking. Now, due to the high toxicity of carbon monoxide, natural gas is used instead. Syngas may be used as an intermediate for the production of other chemicals. South Africa uses gasification of coal for much of its petrochemical needs.

Yet another example of mid-stream processing (block 30 of FIG. 1) is coal liquefaction or "Coal-To-Liquids" (CTL). Coals can also be converted into liquid fuels like gasoline or diesel by several different processes. The Fischer-Tropsch process of indirect synthesis of liquid hydrocarbons was used in Nazi Germany for many years and is currently used by Sasol in South Africa. Coal can be gasified to make syngas (a balanced, purified mixture of CO and $H_2$ gas) and the syngas condensed using Fischer-Tropsch catalysts to make light hydrocarbons which are further processed into gasoline and diesel. Syngas can also be converted to methanol, which can be used as a fuel, fuel additive, or further processed into gasoline via the Mobil M-gas process.

Figure 2:
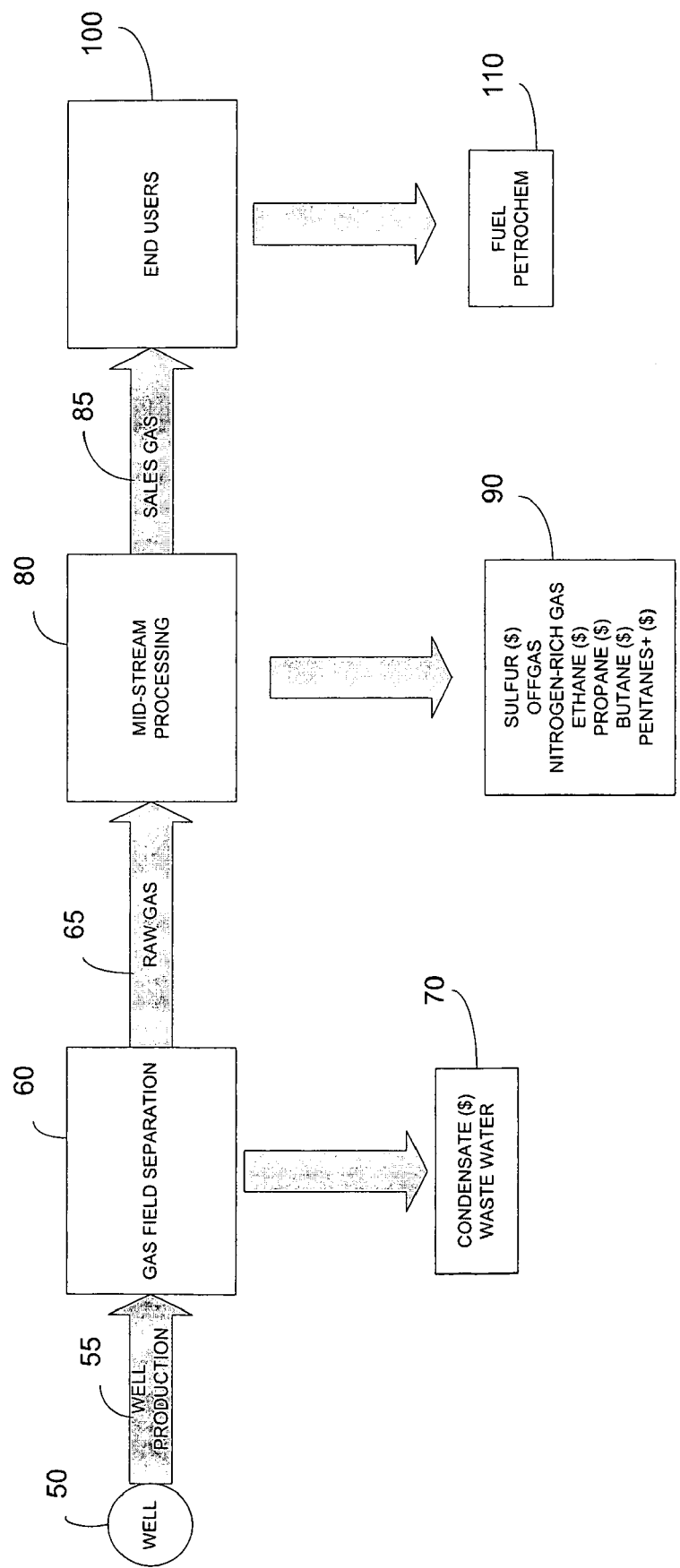
FIG. 2 is a block diagram showing typical steps involved in the production and use of natural gas and its associated byproducts.

The generic process illustrated in block form in FIG. 1 is shown in more detail for natural gas production in FIG. 2. A gas well 50 produces well production fluids 55 which typically comprise methane and water, but also includes significant quantities of ethane, propane, butane, and pentane-heavy hydrocarbons removed later on as condensate—as well as carbon dioxide, nitrogen, helium and hydrogen sulfide. Before natural gas can be used as a fuel, it must undergo extensive processing to remove almost all materials other than methane. The by-products of that processing include ethane, propane, butanes, pentanes and higher molecular weight hydrocarbons, elemental sulfur, and sometimes helium and nitrogen. Some of these components have economic value while others are waste products and must be disposed of.

A typical gas field will have separation units for removing water and condensates from the gas extracted from the wells. Natural gas condensate is a low-density mixture of hydrocarbon liquids that are present as gaseous components in the raw natural gas produced from many natural gas fields. It condenses out of the raw gas if the temperature is reduced to below the hydrocarbon dew point temperature of the raw gas. The natural gas condensate is also referred to as simply condensate, or gas condensate, or sometimes natural gasoline because it contains hydrocarbons within the gasoline boiling range. Block 60 of FIG. 2 shows the gas field separation function 60 which produces raw gas 65 and natural gas condensate together with waste water (block 70). Natural gas condensate may go to an oil refinery for further processing and the water is disposed of as waste water.

The raw gas 65 may then be transported—typically by pipeline—to a natural gas processing plant (i.e., a mid-stream processing facility; block 80) where the gas undergoes additional processing. The initial purification is usually the removal of acid gases (hydrogen sulfide and carbon dioxide). There are many processes that are available for that purpose, but amine treating is the most widely used process. A new process based on the use of polymeric membranes to dehydrate and separate the carbon dioxide and hydrogen sulfide from the natural gas stream is gaining acceptance.

The acid gases removed by amine treating are then routed into a sulfur recovery unit which converts the hydrogen sulfide in the acid gas into elemental sulfur. There are a number of processes available for that conversion, but the Claus process is by far the most commonly used process for this purpose. The residual gas from the Claus process is commonly called "tail gas" and that gas is then processed in a tail gas treating unit (TGTU) to recover and recycle residual sulfur-containing compounds back into the Claus unit. The final residual gas from the TGTU is incinerated. Thus, the carbon dioxide in the raw natural gas ends up in the incinerator flue gas stack.

The next step in the gas processing plant is to remove water vapor from the gas using either the regenerable absorption in liquid triethylene glycol (TEG), commonly referred to as glycol dehydration, or a Pressure Swing Adsorption (PSA) unit which is regenerable adsorption using a solid adsorbent.

Mercury is then removed by using adsorption processes such as activated carbon or regenerable molecular sieves.

Nitrogen is next removed and rejected using one of the three processes: a cryogenic process that uses low temperature distillation (a process that can be modified to also recover helium); an absorption process using lean oil or a special solvent as the absorbent; or, an adsorption process using activated carbon or molecular sieves as the adsorbent.

The next step is to recover the natural gas liquids (NGL). To effect this recovery, most large, modern gas processing plants use another cryogenic low temperature distillation process involving expansion of the gas through a turbo-expander followed by distillation in a de-methanizing fractionating column. Some gas processing plants use a lean oil absorption process rather than the cryogenic turbo-expander process.

The residue gas from the NGL recovery section is the final, purified sales gas (85) which is most-commonly piped to the end-user markets (100) where it may be utilized as fuel or feedstock for petrochemicals (110).

The recovered NGL stream is processed through a fractionation train consisting of three distillation towers in series: a de-ethanizer, a de-propanizer and a de-butanizer. The overhead product from the deethanizer is ethane and the bottoms are fed to the de-propanizer. The overhead product from the de-propanizer is propane and the bottoms are fed to the debutanizer. The overhead product from the debutanizer is a mixture of normal and iso-butane, and the bottoms product is a $C_5$+ mixture. The recovered streams of propane, butanes and $C_5$+ which may be "sweetened" in a Merox process unit (mercaptan oxidation) to convert undesirable mercaptans into disulfides are, along with the recovered ethane, the final NGL by-products from the gas processing plant (block 90 of FIG. 2).

While the particulars of production or midstream processing can be anything imaginable under this invention, the preceding discussion was to highlight places where carbon netback credits can be earned.

Figure 3:
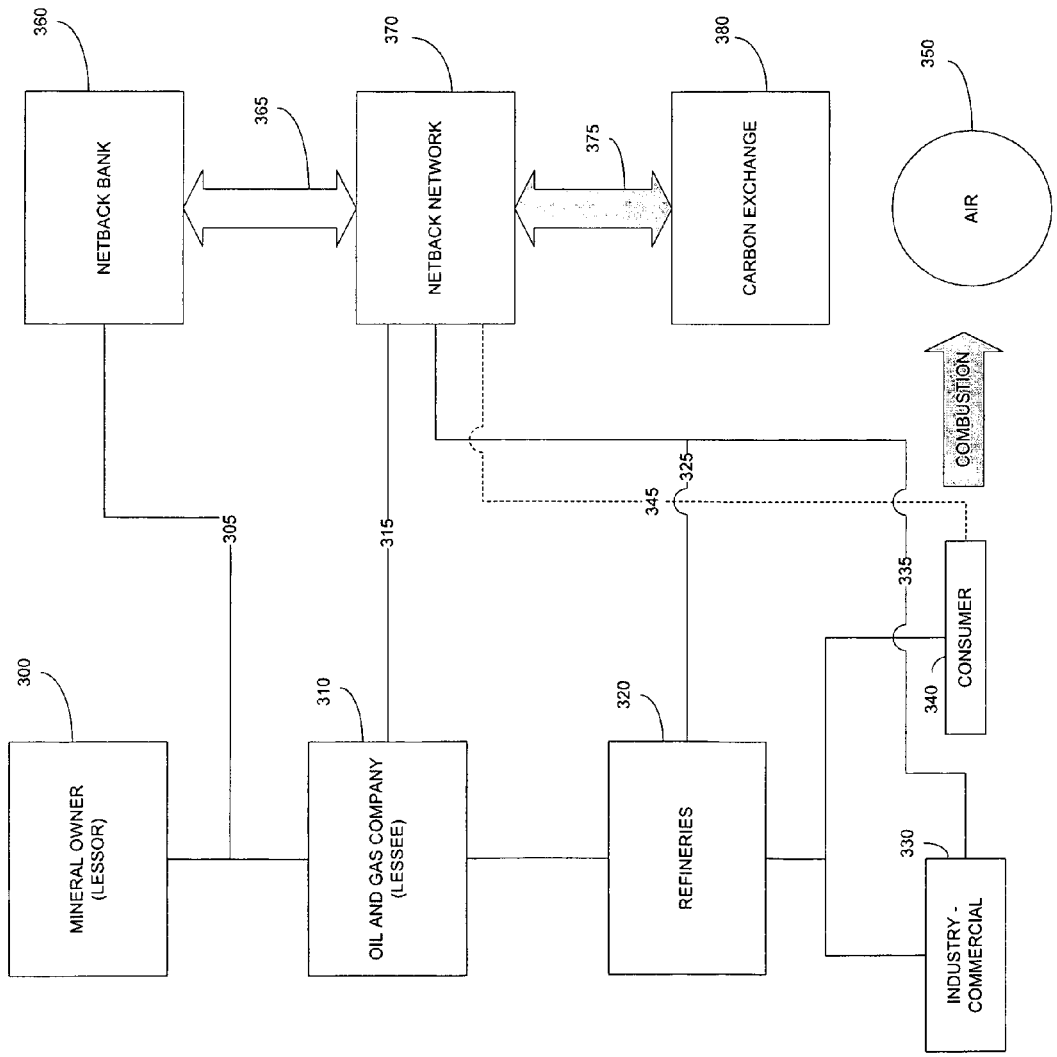
FIG. 3 is a block diagram of one embodiment of a system according to the invention.

By way of example, a system according to one embodiment of the present invention is shown in block form in FIG. 3. The owner of a mineral resource (block 300) typically enters into a lease agreement with an exploration and production company (block 310) to extract, process and sell the mineral. In the example illustrated in FIG. 3, the minerals are oil and gas and the lessee is an oil company. It will be appreciated by those skilled in the art that "oil wells" typically produce both oil and gas which are separated at the surface. Worldwide, most mineral owners are government entities. These entities control the terms and provisions which are written into oil, gas and mineral leases and these lessors direct the exploration and production of these resources.

Continuing "downstream" through the process chain, the oil and gas is processed in refineries (block 320) to fractionate, reform and remove impurities from the petroleum products. Often, the refinery is a unit of the producing oil and gas company 310. However, in other cases, the refiner is an unrelated entity. This is often the case for imported oil. The products of the refinery are sold into the stream of commerce. Some products (or some fraction of certain refinery products) go to consumers 340 who burn (at arrow 335) the product (e.g., gasoline, diesel, jet fuel) releasing pollutants (e.g. $NO_x$) and greenhouse gases (e.g., carbon dioxide) into the atmosphere 350. Other refinery products go to commercial users 330 who may use the product(s) as feedstock for petrochemicals. Depending on the end product, the carbon in the feedstock may be sequestered for a significant period of time.

In the representative system shown in FIG. 3, an agreement between the mineral owner 300 and the oil and gas company 310 provides for the deposit, into bank 360, of a certain sum which may be dynamically related to the carbon content and/or impurity levels of the oil and/or gas produced. This agreement may be a part of the lease agreement between the mineral owner 330 and the producing oil company 310. The link 305 between the lessor 300 and/or lessee 310 and the netback bank 360 may provide for an automated transfer of a certain portion of the royalty to the netback bank 360. Alternatively, the netback deposit may be entirely the responsibility of the lessor 300 inasmuch as the pollution mitigation occasioned by the use of the mineral resource may logically be an offset to the value of the mineral.

The assessed charge may be a function of both the quantity of a given produced mineral resource and the nature and quantity of impurities contained therein. Automated equipment and methods known in the art may be used to automatically track a production run or processed batch of a certain mineral. Substantially simultaneously, a pollution value established by and obtained from an open market may be associated with the batch or production run. The assessed charge may be computed from the established pollution value and batch or production run quantity. The tracking system may maintain the association of a certain pollution value and/or assessed charge with a certain batch or production run throughout the mineral's movement through the processing, distribution and end-use phases.

Netback network 370 tracks the downstream flow and disposition of the mineral and its byproducts via data links 315, 325, 335, and/or 345. In one particular preferred embodiment, this tracking is accomplished automatically via in-line process monitors and analyzers. In this way, a prepaid carbon and/or pollution credit in the form of a monetary deposit in netback bank 360 may be "attached" to a certain production run of the produced mineral. In certain embodiments, in-line process analyzers may be used to ensure that the chemical characteristics of the product fall within certain pre-selected limits—i.e., the mineral is of sufficient uniformity to give it like treatment in the system. If certain parameters are exceeded, the system may automatically segment the product into different batches which may be treated differently by the system. In a preferred embodiment, the produced resource may be "tagged" by any known process, for example dyes or low level radiation, to identify that a payment to the carbon netback bank has been made on that resource. Of course, the present invention is designed to interface with any pollution marketplace, a carbon exchange is merely one example.

In the embodiment illustrated in FIG. 3, netback network 370 is in data communication with carbon exchange 380 via link 375. Carbon exchange 380 provides real time valuation for carbon credits and the like thereby enabling netback network 370 to assign a monetary value to the original produced resource and the later mitigation activities which the oil and gas company 310, refinery 320, commercial user 330 or unrelated third parties may undertake.

The sums deposited in netback bank 360 may be dispensed by the system to oil and gas company 310, refinery 320, commercial user 330 (even consumers) or unrelated third parties to compensate them for pollution or greenhouse gas mitigation activities. For example, if refinery 320 were to process a certain batch of crude oil to produce an exceptionally low-sulfur diesel fuel, it might be eligible for a related payment from netback bank 360. Conversely, the owner of a particularly "sour" gas deposit, might be required to deposit at a higher rate into the netback system to compensate for the increased pollution load of that mineral product.

In another example, an industrial user 330 of petroleum as a chemical feedstock could be eligible for withdrawal from the netback bank 360 for producing polyvinyl chloride polymer because that use of the mineral sequesters carbon for a relatively long period of time and that particular, tracked portion of the mineral's production does not result in the release of carbon dioxide greenhouse gas into the atmosphere.

In certain embodiments, some fraction of the netback deposit is paid as a fee for operation of the system. In yet other embodiments, a per-transaction fee may be assessed to fund the operation of the system. If the use of the resource in the stream of commerce does not result in the carbon netback being earned back as credits, the remaining netback can be used to compensate, at least in part, for the effects caused by the pollutants that were not removed or sequestered.

It is currently believed that greenhouse gas emissions have a global effect—e.g., carbon dioxide produced by the combustion of hydrocarbon fuels diffuses throughout the atmosphere and the greenhouse effect is not localized. This, however, is not the case for many airborne pollutants and wind patterns and precipitation can result in a geographically-limited effect.

Returning to FIG. 1 and considering coal as the mineral example it may be seen that, at block 40, coal is delivered to end users who most frequently use it as a fuel. Combustion of coal, like any other fossil fuel, occurs due to an exothermic reaction between the components of the fuel source and the components of the air surrounding it. Coal is made primarily of carbon, but also contains sulfur, oxygen and hydrogen. The reaction between coal and the air surrounding it produces oxides of carbon, usually carbon dioxide ($CO_2$) in a complete combustion, along with oxides of sulfur, mainly sulfur dioxide ($SO_2$), and various oxides of nitrogen ($NO_x$). Because of the hydrogen and nitrogen components of air, hydrides and nitrides, of carbon and sulfur, are also produced during the combustion of coal in air. These could include hydrogen cyanide (HCN), sulfur nitrate ($SNO_3$) and many other toxic substances.

Acid rain may occur when the sulfur dioxide produced in the combustion of coal, reacts with oxygen to form sulfur trioxide ($SO_3$), which then reacts with water molecules in the atmosphere to form sulfuric acid. The sulfuric acid ($H_2SO_4$) is returned to the Earth as acid rain. Flue gas desulfurization scrubbing systems, which use lime to remove the sulfur dioxide can reduce or eliminate the likelihood of acid rain.

In a system according to the present invention, the owner/operator of a coal mine may deposit a sum into the netback bank that is a function both of the quantity of coal produced and its sulfur content. The netback network may track the coal to its use in one or more coal-fired powerplants. The system may also be linked to weather-reporting or weather-recording systems in order to dynamically allocate payments from the netback account to communities effected by the acid rain so produced as determined by the winds and rain occurring during the combustion of that particular batch of coal.

However, another form of acid rain is due to the carbon dioxide emissions of a coal plant. When released into the atmosphere, the carbon dioxide molecules react with water molecules, to produce carbonic acid ($H_2CO_3$). This, in turn, returns to the earth as a corrosive substance. As noted above, there is believed to be a global effect of GHG $CO_2$ whereas the effects of acid rain are more localized. Accordingly, given sufficient data, the system may even allocate netback deposits for a single mineral production batch to both local and global mitigations depending on the fraction of the resulting carbon dioxide that become carbonic acid.

Although the invention has been described in detail with reference to certain preferred embodiments, variations and modifications exist within the scope and spirit of the invention as described and defined in the following claims.

What is claimed is:

1. A computer system for allocating at least one environmental cost associated with the use of a mineral natural resource comprising:
    a non-transitory, computer-readable medium storing data representing account information for producers of mineral natural resources and data received by or created by program code;
    first program code that receives input of at least one characteristic of the mineral natural resource produced by a producer with an account, and assesses a charge that is a function of at least one characteristic of the mineral;
    second program code that records receipt of a sum equal to the assessed charge in an account associated with the producer of the mineral natural resource;
    third program code that receives input regarding the producer's processing or use of the mineral natural resource, for which the assessed charge has been stored in the producer's account, and downstream processing or uses of the mineral natural resource by others and tracks any downstream processing and the use of the mineral natural resource; and
    fourth program code that calculates an amount of the previously assessed charge that should be distributed back to the producer or to another downstream user or processor of the mineral natural resource, or to an unrelated third party based on other conservation activities.

2. A computer system as recited in claim 1 wherein the at least one characteristic of the mineral natural resource includes the quantity of the mineral natural resource produced by the producer.

3. A computer system as recited in claim 1 wherein the at least one characteristic of the mineral natural resource includes the concentration of at least one impurity in the mineral natural resource.

4. A computer system as recited in claim 1 wherein the at least one characteristic of the mineral natural resource the quantity of carbon dioxide produced upon combustion of a unit quantity of the mineral natural resource.

5. A computer system as recited in claim 1 wherein the third program code further tracks the end use of the mineral natural resource and the fourth program code further calculates the amount to be distributed based on the particular end use of the mineral natural resource.

6. A computer system as recited in claim 1 wherein assessing a charge comprises obtaining data from an exchange.

7. A computer system as recited in claim 1 wherein processing of the mineral natural resource comprises refining the mineral natural resource.

8. A computer system as recited in claim 7 wherein refining the mineral natural resource comprises fractionation and tracking comprises tracking a plurality of the fractions so produced.

9. A computer system as recited in claim 1 wherein the at least one characteristic of the mineral natural resource includes the quantity of the mineral natural resource produced from a certain deposit of the mineral natural resource.

10. A computer system as recited in claim 1 wherein assessing the charge further comprises normalizing the quantity of the mineral natural resource produced based on the BTU content of the mineral natural resource.

11. A computer system as recited in claim 1 wherein the mineral natural resource is selected from the group consisting of oil, natural gas and coal.

12. A computer system for allocating at least one environmental cost associated with the use of a mineral natural resource comprising:
    a computer processor configured with:
        first program code that receives input regarding a mineral natural resource produced by a producer;
        second program code capable of determining a charge that is a function of at least one characteristic of the mineral natural resource;
        third program code capable of storing a sum equal to the assessed charge in an account associated with the mineral natural resource;
        fourth program code that receives input regarding and tracks any downstream processing of and the use of the mineral natural resource after production;
        fifth program code capable of calculating an amount to be disbursed from at least a portion of the stored sum based on the quantity of a byproduct of the combustion of the mineral natural resource the release of which into the atmosphere is prevented.

13. A computer system as recited in claim 12 wherein the byproduct of the combustion of the mineral natural resource is a greenhouse gas.

14. A computer system as recited in claim 13 wherein the greenhouse gas is carbon dioxide.

15. A computer system as recited in claim 12 further comprising the capability of calculating an amount to be disbursed of the stored sum for remediation of damage caused by the release of a pollutant in the mineral natural resource not removed or sequestered during processing of the mineral natural resource.

16. A computer system as recited in claim 12 further comprising the capability of calculating an amount to be disbursed of the stored sum in compensation for damage caused by the release of a pollutant in the mineral natural resource not removed or sequestered during processing of the mineral natural resource.

17. A computer system for calculating the sums to be reimbursed for at least a portion of the costs associated with carbon sequestration comprising:
   a computer processor configured with:
      first program code that receives input regarding a hydrocarbon mineral resource produced by a producer;
      second program code capable of determining a charge that is a function of at least one characteristic of the hydrocarbon mineral resource and the quantity produced of the hydrocarbon mineral resource;
      third program code capable of storing a sum equal to the assessed charge in an account associated with the hydrocarbon mineral resource;
      fourth program code that receives input regarding and tracks any downstream processing and the use of the hydrocarbon mineral resource;
      fifth program code capable of obtaining information relating to the current monetary value of carbon sequestration per unit of carbon from an exchange;
      sixth program code capable of adjusting the assessed charge based on the current monetary value of carbon sequestration;
      seventh program code capable of disbursing at least a portion of the stored sum based on the quantity of carbon sequestered.

18. A computer system as recited in claim 17 wherein the hydrocarbon resource is selected from the group comprised of oil, natural gas and coal.

19. A computer system as recited in claim 17 wherein the fourth program code further comprises tracking the capability to track a plurality of fractions of the hydrocarbon produced during processing.

20. A computer system as recited in claim 17 further capable of exchanging information with an exchange concerning the quantity of a certain hydrocarbon resource for which a sum based on an assessed charge has been stored.

21. A computer system as recited in claim 20 further capable of furnishing an exchange with information concerning the magnitude of the stored sum.

22. A computer system as recited in claim 17 further capable of purchasing carbon credits on an exchange and debiting the stored sum in an amount equal to the monetary value of the carbon credits.

23. A computer system of claim 1 wherein the system is made up of distributed computers.

24. A computer system of claim 23 wherein the distributed computers are connected over a network.

25. A computer system of claim 24 wherein the network is the internet.

26. A computer system of claim 12 wherein the system is made up of distributed computers.

27. A computer system of claim 26 wherein the distributed computers are connected over a network.

28. A computer system of claim 27 wherein the network is the internet.

29. A computer system of claim 17 wherein the system is made up of distributed computers.

30. A computer system of claim 29 wherein the distributed computers are connected over a network.

31. A computer system of claim 30 wherein the network is the internet.

* * * * *